M. F. WILLIAMS.
FLEXIBLE FACING FOR PULLEYS.
APPLICATION FILED FEB. 27, 1920.
1,434,239.
Patented Oct. 31, 1922.
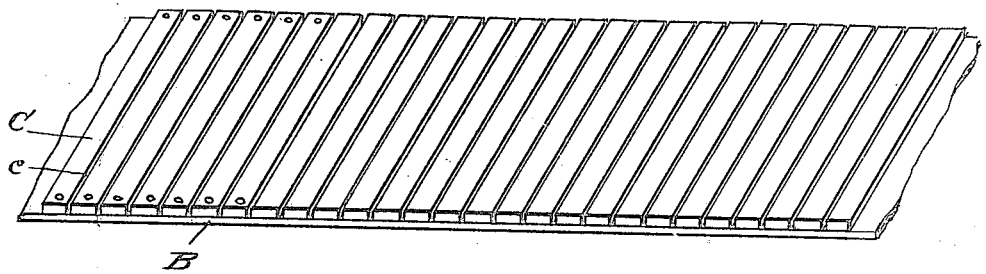
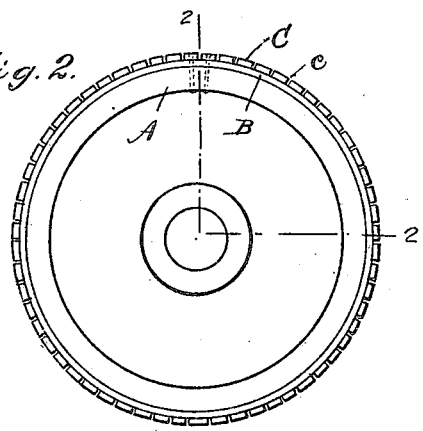
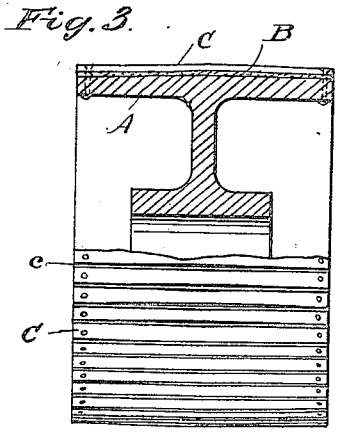
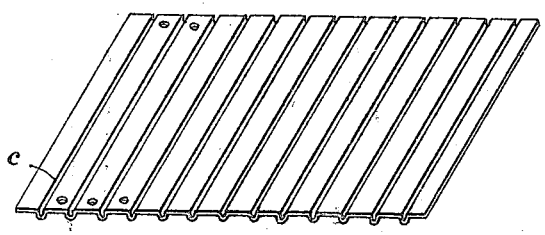
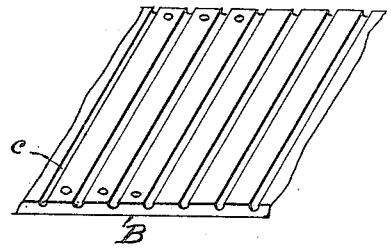
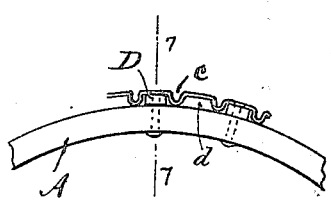
Inventor
Milton F. Williams,
By H. M. Paisted
Attorney.

Patented Oct. 31, 1922.

1,434,239

UNITED STATES PATENT OFFICE.

MILTON F. WILLIAMS, OF ST. LOUIS, MISSOURI, ASSIGNOR OF FORTY-NINE ONE-HUNDREDTHS TO HAROLD M. PLAISTED, OF ST. LOUIS, MISSOURI.

FLEXIBLE FACING FOR PULLEYS.

Application filed February 27, 1920. Serial No. 361,809.

*To all whom it may concern:*

Be it known that I, MILTON F. WILLIAMS, a citizen of the United States, residing at St. Louis, State of Missouri, have invented certain new and useful Improvements in Flexible Facings for Pulleys, of which the following is a specification.

This invention relates to certain new and useful improvements in flexible facings for pulleys, the peculiarities of which will be hereinafter described and claimed.

The main object of my invention is to provide a flexible facing with cross grooves which can be readily attached to an ordinary pulley and provide side outlet passages for the air that is drawn in between the pulley and the belt. By doing away with the cushioning air the adhesion of the belt is increased with consequent increase of tractive efficiency, regularity of angular velocity by avoidance of belt slippage, and reduction of wear on the belt.

In the accompanying drawing on which like reference letters indicate corresponding parts, Fig. 1 represents a perspective view of a strip of flexible material with a series of slats mounted thereon, so as to provide spaces between the slats; Fig. 2 a side view of a pulley embodying my invention; Fig. 3 a face view of said pulley, partly in section on the line 2—2 of Fig. 2; Fig. 4 a perspective view of a strip of flexible sheet metal formed with cross grooves by bending the metal; Fig. 5 a similar view of my flexible facing with cross grooves cut in one face; Fig. 6 a side view of part of a pulley rim with the sheet facing shown in Fig. 4 applied thereto; and Fig. 7 a sectional view of Fig. 6 on the line 7—7.

As is well known, the air cushion between a traveling belt and its pulley, prevents close adhesion of the belt and pulley face and results in slippage and consequent loss of power efficiency, and causes the belt to wear. My present improvements are designed to effect a change in the face of a pulley by means that can be readily applied without material increase of the diameter and will attain the objects stated above.
Referring to the drawings, the letter A designates the rim of a pulley of crown face or other style, which is to be provided with my improved facing. This facing consists of a flexible strip or backing B, that is provided on its outer face with a series of cross grooves $c$ forming passages for the exit of the air drawn in by the oncoming belt. In Fig. 1 these passages are formed by slats C riveted or otherwise secured to the flexible backing B, and separated a slight distance as indicated in the figure, so that when the facing is bent around a pulley as shown in Fig. 2, the slats will separate yet more and form passages of comparatively slight width and suitable depth across the face of the pulley, by which the air cushion finds exit at the edge of the rim. This facing is riveted or otherwise secured to the pulley face as indicated in Fig. 5, and the relatively small width of the grooves $c$ does not materially decrease from the contact surface between the belt and the pulley, and such decrease is more than made up by the better contact of the belt with the pulley facing between the grooves, on account of doing away with the cushioning air.

This flexible facing may likewise be formed of sheet metal as indicated in Fig. 4 which may be bent, pressed, or otherwise formed with transverse grooves, preferably as indicated in Fig. 4, and applied to the face of a pulley as indicated in Figs. 6 and 7. In this sheet form a hollow space, $d$, is left between the pulley face and the underside of the sheet material, and at the points where the sheet is riveted, a washer or filler piece D, Fig. 7, is provided to prevent the rivet pulling down the sheet material.

When a pulley is provided with a straight face, the flexible facing with its transverse grooves will be fastened thereto without change except a slight widening of the grooves in bending the flexible material to the curve of the pulley, and the grooves will be substantially uniform throughout their length.

When the pulley face is crowned however, the application of the flexible facing to the crown face of the pulley will cause a similar crowning effect in the flexible facing, that will diminish the width of the cross grooves at the rim of the pulley on account of the slightly lessened diameter at the rim. On account of the flexible nature of the facing and the more or less radial walls of the cross grooves, this variation in the width of the groove is effected as above stated, and the flexible facing will likewise be crown face but the grooves will be of greater width at the center of the crowning thereby increasing the grip of the belt upon the grooves.

In Fig. 5 is shown a form of my flexible facing in which the grooves are cut from a strip of material of sufficient thickness to allow of such grooving on the outer face only, and such flexibility that it will bend in both directions around the pulley and across the pulley, when it is a crown pulley on which the facing is applied. In the sheet material form shown in Figs. 4 and 6, cross grooves are provided both above and below,—that is, on the outer and the inner faces of the sheet or strip of material, but in Fig. 5 the outer face only is grooved. In both styles, as well as that shown in Fig. 1, the grooves are slightly increased in width by the bending action produced by applying the facing to the pulley rim, and are of maximum width in the center when applied to a crown face pulley.

I desire to claim broadly this flexible facing for a pulley or similar article to which it is adapted and do not limit myself to the exact construction herein shown.

I claim:

1. The combination with a pulley having a crown face, of a flexible facing having cross grooves,—the said grooves being widest in the crown center of the face and narrowed at the edge of the pulley rim by adjustment of said facing to the crowning of the pulley.

2. As a new article of manufacture a flexible pulley-facing having continuous cross grooves extending from rim to rim on its outer surface, and adapted to conform to the outer face of a pulley, substantially as described.

3. As a new article of manufacture, a flexible pulley facing of sheet material having cross grooves on the outer and the inner surfaces and adapted to conform to the outer face of a pulley, substantially as described.

4. As a new article of manufacture, a flexible pulley facing having cross grooves in the outer surface,—said grooves being relatively narrow and the surface between said grooves being relatively broad to provide belt contact with minimum loss of bearing surface for the belt.

5. As a new article of manufacture, a flexible pulley facing comprising a flexible backing and a series of slats transversely mounted on the outer face of said backing and adapted to separate and form transverse passages between adjacent slats when said facing is bent around and secured to a pulley, substantially as described.

In testimony whereof I have affixed my signature.

MILTON F. WILLIAMS.